United States Patent [19]
Kadar

[11] 3,710,249
[45] Jan. 9, 1973

[54] SLIDEBACK PEAK CIRCUITS WITH CONSTANT TONE INDICATIONS
[75] Inventor: Nicholas M. Kadar, Los Angeles, Calif.
[73] Assignee: The Singer Company, New York, N.Y.
[22] Filed: May 6, 1971
[21] Appl. No.: 140,804

[52] U.S. Cl. ...............................324/103 P, 324/98
[51] Int. Cl. ........................G01r 19/16, G01r 17/02
[58] Field of Search .....324/103 P, 103 R, 123 R, 98, 324/99 R, 102

[56] References Cited

OTHER PUBLICATIONS

Selby, M. C.; VTVM Circuits; Electronics; May 1950; pgs. 110–111.
Ammerman, C. R., An Automatic...; Rev. of Sci. Instruments; February 1953; pgs. 161–164.

Primary Examiner—Rudolph V. Rolinec
Assistant Examiner—Ernest F. Karlsen
Attorney—Marshall J. Breen, Chester A. Williams, Jr. and Martin Sachs

[57] ABSTRACT

A peak detector measuring apparatus having an audio output tone which is abruptly cut-off when a DC voltage is manually adjusted to be equal to the peak value of an input signal voltage wave. The apparatus is suitable to measure the peak value of unmodulated signals, amplitude modulated signals, and pulse modulated signals having relatively narrow pulse widths and relatively low repetition rates.

5 Claims, 6 Drawing Figures 3,710,249

INVENTOR.
Nicholas M. Kadar

BY Martin Sachs

ATTORNEY

SLIDEBACK PEAK CIRCUITS WITH CONSTANT TONE INDICATIONS

BACKGROUND OF THE INVENTION

The present invention relates to a method and apparatus for accurately measuring the peak amplitude of electrical signal voltage waves, and more particularly to a method and apparatus for measuring the peak value of an electromagnetic interference voltage wave.

Prior art techniques for measuring the peak value of electromagnetic interference waves or radio interference waves (RFI) frequently made use of a slideback peak circuit. This type of circuit is specified to be used in certain tests by military radio interference specifications MIL–I–16910 and MIL–STD–826. This circuit measures the peak value of relatively narrow repetitive pulses (e.g. pulse modulated RF or IF waves), which can not be indicated directly on a vacuum tube voltmeter (VTVM), by substituting for this modulated or noise wave a DC voltage which is then read on a slow response VTVM.

The conventional slideback peak circuit utilizes a DC voltage to bias a diode detector to cut-off, thereby preventing any noise or modulation from being amplified and converted to an audible signal. Determining the cut-off point of the diode is obviously difficult if not impossible for pure CW signal waves, since some form of amplitude modulation is required on the CW to obtain an aural output indication. However, some random noise is usually acquired by the RF or IF signal within the RFI meter itself, thereby making the meter useable, but with unreliable accuracy.

Present day RFI meters are very sensitive and the inherent internal noise is kept to a minimum. It is therefore necessary for the operator to subjectively determine the cut-off point of the diode detector which must be accomplished with widely varying sound levels and pitches.

The present invention overcomes the disadvantages of prior art devices by providing a constant output tone as long as the DC voltage is less than the peak value of the signal wave and abruptly cuts-off the audio output tone when the DC voltage is equal to the peak value of the signal wave. This increases the accuracy of the measurement by essentially eliminating the subjective discretion of the operator.

SUMMARY OF THE INVENTION

An apparatus for measuring the peak value of an AC voltage wave, having a relatively narrow pulse width and a relatively low repetition rate, in accordance with the principles of the present invention, comprises, an adjustable DC voltage, comparator means for comparing the peak value of the AC voltage wave with the adjustable DC voltage, the comparator means providing a first output voltage level when the peak value of the AC voltage wave exceeds the adjustable DC voltage and a second output voltage level when the peak value of the AC voltage wave is less than the adjustable DC voltage. In addition, oscillator means for providing an audio voltage to activate a transducer is provided with gating means coupled to the oscillator means for starting and stopping the oscillator means. The oscillator means being started at the first output voltage level and stopped at the second output voltage level. Also, pulse stretching means is coupled between the comparator means and the gating means for stretching the first output voltage level, and indicating means is coupled to the adjustable DC voltage for indicating the value of the adjustable DC voltage when the oscillator means is stopped.

A method for measuring the peak value of an electromagnetic interference wave incorporating the principles of the present invention comprises the steps of receiving the electromagnetic interference wave, detecting the wave, comparing the detected wave with the value of an adjustable DC voltage in a comparator, which provides an output voltage when the demodulated wave is greater in value than the adjustable DC voltage, stretching the comparator output voltage, gating an audio oscillator means which provides an audible tone by means of an amplifier and transducer responsive to the output voltage, and reading the adjustable DC voltage on an indicating device at the point the audible tone ceases.

A complete understanding of the present invention may be obtained from the following detailed description, when taken in conjunction with the accompanying drawings in which:

DESCRIPTION OF THE PREFERRED EMBODIMENT

Figure 1:
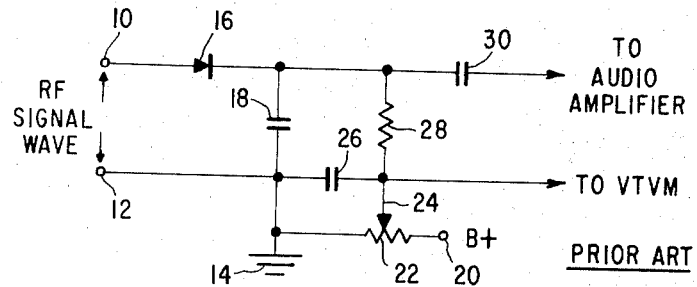
FIG. 1 is a schematic circuit diagram of a slideback peak circuit used in the prior art.

Referring to the drawings, and particularly to FIG. 1, wherein the RF or IF signal voltage wave to be measured is coupled to input terminals 10 and 12. Terminal 12 is a connected to a ground reference 14. The signal voltage is detected or rectified by diode 16 and stored in capacitor 18.

A source of DC voltage (B+) is connected to terminal 20. A potentiometer 22 is connected from terminal 20 to ground reference 14 thereby providing a variable DC voltage at its wiper arm 24, which is manually adjustable. Connected from the wiper arm 24 of potentiometer 22 to ground terminal 14 is capacitor 26, which bypasses any RF from the DC voltage source and permits smooth incremental adjustments in the DC voltage.

Also, connected from wiper arm 24 to the junction of diode 16 and capacitor 18 is resistor 28 which couples the DC voltage to the diode 16. Connected to the junction of diode 16 and capacitor 18 is capacitor 30 which couples any AC signals or noise pulses that appear across capacitor 18 to an audio amplifier and speaker, not shown. A conventional DC VTVM, not shown, coupled to wiper arm 24 is used to indicate the value of the DC voltage appearing on the wiper arm at the time the audio noise or modulation is cut-off.

In operation, the circuit of FIG. 1 is capable of providing an aural signal as long as noise or amplitude modulation appears on the RF or IF signal wave. The wiper arm 24 is manually adjusted so that its voltage increases to a point wherein the DC voltage coupled from the wiper arm 24 through resistor 28 to the cathode of diode 16 is of a value sufficient in magnitude to prevent the diode 16 from rectifying the input signal. The DC voltage indicated on the VTVM at this point will be equal to the peak value of the input signal. An operator is unable to reliably determine exactly when this point occurs if no modulation or noise appears on the input signal. With only noise present on the input signal it is difficult to accurately determine the cut-off point of the diode. Automatic systems for reading the peak value of the input signal voltage wave introduce the same errors, since the determination of the zero or null point is subject to error.

Figure 2:
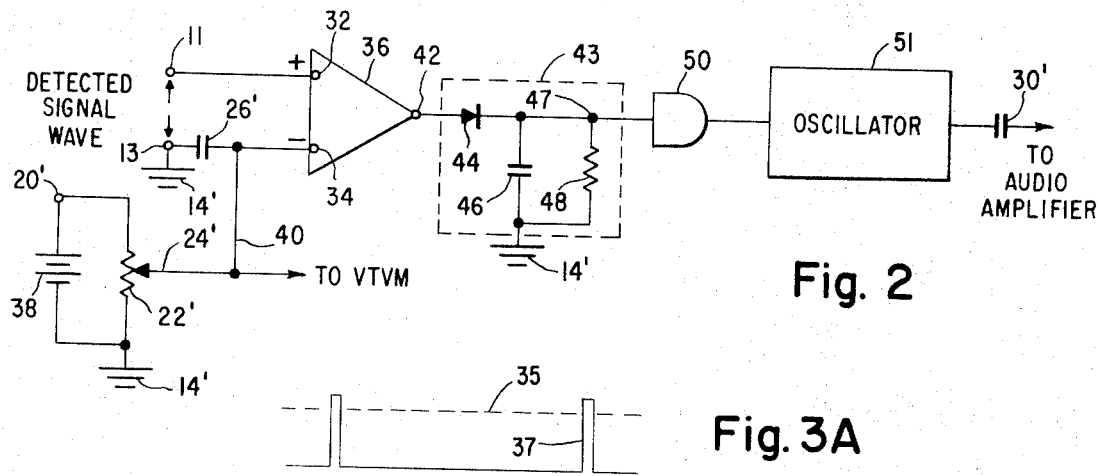
FIG. 2 is a schematic circuit diagram of a slideback peak circuit utilizing the principles of the present invention.

The preferred embodiment of the present invention is shown in FIG. 2, wherein the signal voltage wave to be measured is coupled across terminals 11 and 13 which correspond to the detected voltage appearing across the capacitor 18 of FIG. 1. The detected voltage is then coupled to the input terminals 32 and 34 of differential operational amplifier 36 which functions as a voltage comparator. Terminal 13 is coupled to reference ground 14' and terminal 11 is coupled to the noninverting input terminal 32 of amplifier 36.

Coupled across terminals 20' and reference ground 14' is a source of DC voltage 38. Potentiometer 22' is connected across terminal 20' and ground reference 14' providing a DC voltage which is adjustable at wiper arm 24'. The DC voltage appearing on wiper arm 24' is connected via conductor 40 to the inverting terminal 34 of the differential operational amplifier 36 and to an indicating device such as a DC VTVM.

The output terminal 42 of amplifier 36 is coupled to a pulse stretching circuit 43 comprised of diode 42, capacitor 46 and resistor 48 connected in parallel. Diode 44, capacitor 46 and resistor 48 are one example of a circuit suitable for providing pulse stretching. Diode 44 prevents the discharging of capacitor 46 through the output impedance of amplifier 36.

Coupled to the pulse stretching circuit 43, at the junction of diode 44, capacitor 46 and resistor 48 is gating circuit 50, which accepts the pulse stretched voltage and provides a trigger voltage for turning on oscillator 51. In the present embodiment of the invention oscillator 51 is a conventional free running (astable) multivibrator. The output of oscillator 51 is coupled through a capacitor 30' to a conventional audio amplifier and transducer not shown. The transducer may typically be a speaker or headphone.

In operation, a detected signal coupled to terminals 11 and 13 will cause a positive output to appear at terminal 42, of the comparator amplifier 36, if the signal voltage exceeds the DC voltage appearing on terminal 34. This output voltage charges capacitor 46 through diode 44 to the saturation level of the comparator. The fully charged capacitor 46 turns on gate 50 which in turn triggers on oscillator 51.

If the peak value of the input signal voltage is either modulated or unmodulated and greater than the DC voltage at terminal 34 (which is connected to the wiper 24') a constant audible tone is heard in the headphone or speaker.

The wiper arm 24' is then manually moved in a direction to increase the voltage at terminal 34. At the point that the voltage at terminal 34 is equal to the peak value of the input signal voltage appearing at terminal 32 the voltage at output terminal 42 reduces to zero. Increasing the voltage at terminal 34 so that the voltage is greater than the peak value of the signal voltage at terminal 32 will cause the voltage at terminal 42 to become negative.

Either condition, zero or negative output voltage at terminal 42 will stop the audible tone of the oscillator 51. The sensitivity of the change from a positive to zero or negative output voltage is selected by varying the gain of the comparator amplifier 36 and is chosen to be compatible with the overall accuracy of the RFI meter. The loss of the tone heard by the operator of the apparatus occurs abruptly and is discernable by different operators without the loss of accuracy.

An indicating device such as a DC VTVM connected to the wiper arm 24' of potentiometer 22' is read at the point the aural tone disappears and is a measurement of the peak value of the input signal voltage wave.

If the input signal is pulse modulated with relatively narrow pulses of a relatively low repetition rate with a peak value greater than the DC voltage applied to terminal 34, an intermittent chirping type of tone will be heard in the headphones. The waveshapes at various points of the circuit in this case are shown in FIGS. 3A, 3B, 3C and 3D.

Figure 3A:
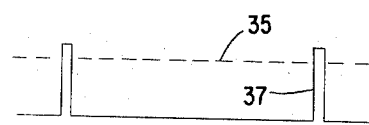
FIGS. 3A, 3B, 3C and 3D are voltage wave shapes occuring at various points in the circuit shown in FIG. 2.
Figure 3B:
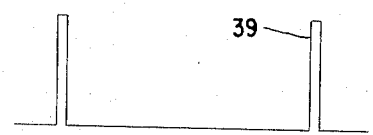
Figure 3C:
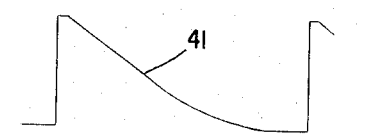
Figure 3D:
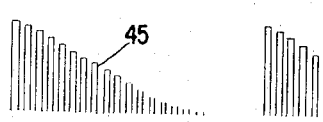

The slideback voltage 35, shown in FIG. 3A, appears at terminal 34 (FIG. 2) and is not equal to the peak value of the input voltage pulses 37 appearing at terminal 32 (FIG. 2). Therefore, the voltage 39 appearing at output terminal 42 of the amplifier 36 is shown in FIG. 3B and the voltage 41 which appears at the output point 47 of the pulse stretching circuit 43 (FIG. 2) is shown in FIG. 3C. The oscillator voltage 45 appearing at point 30' (FIG. 2) is shown in FIG. 3D.

The pulse stretcher circuit 43 stretches narrow pulses in order to insure activation of the gate 50 which in turn provides the trigger pulse to operate the audio oscillator 51. The time constant of the pulse stretcher circuit 43, in the present embodiment of the invention, is 100 milliseconds which yields a chirping tone in the headphones at any repetition rate of the input signal pulses less than 10 per second. At higher repetition rates the tone will be continuous. The time constant of the pulse stretcher circuit 43 may be modified for a particular environment if need be.

The preferred embodiment of the present invention is suitable for operation with CW signals as well as modulated signals or pulses. The sound of the aural tone, volume, and pitch in the headphones are independent of the incoming signal level and amount of modulation and depends only on the frequency of the oscillator 51 and on the gain of the audio amplifier. The pitch may be selected to any pleasant tone and the volume adjusted to the most convenient level for the operator. Since the pitch and volume of the audible sound indicating the peak voltage are constant, the cut-off is very sharp and the reading accuracy is about an order of magnitude better than that of the conventional slideback peak circuits. The preferred embodiment of the present invention may be utilized in RFI meters that use instantaneous logarithmic IF amplifiers with sequential detection. These amplifiers provide an output which does not contain IF signals, but only detected signals, and may be directly connected to the input terminals of the preferred embodiment of the present invention.

Having thus set forth the nature of this invention what I herewith claim is:

1. An apparatus for measuring the peak value of an AC voltage comprising:
   a. an adjustable DC voltage;
   b. comparator means for comparing the peak value of said AC voltage wave with said adjustable DC voltage, said comparator means providing a first output voltage level when the peak value of said AC voltage wave exceeds said adjustable DC voltage and a second output voltage level when the peak value of said AC voltage wave is less than said adjustable DC voltage;
   c. oscillator means for providing an audio voltage to activate a transducer;
   d. gating means coupled to said oscillator means for starting and stopping said oscillator means; said oscillator means being started at said first output voltage level and stopped at said second output voltage level;
   e. pulse stretching means coupled between said comparator means and said gating means for stretching said first output voltage level and,
   f. indicating means coupled to said adjustable DC voltage for indicating the value of said adjustable DC voltage when said oscillator means is stopped.

2. An apparatus for measuring the peak value of an AC voltage wave according to claim 1 wherein said comparator means comprises a differential operational amplifier and said pulse stretching means comprises a diode coupled in series with a resistor and capacitor connected in parallel.

3. An apparatus for measuring the peak value of an AC voltage wave comprising:
   a. a differential operational amplifier having first and second input terminals and an output terminal, said first input terminal having said AC voltage wave coupled thereto, said output terminal providing an output voltage proportional to the difference in voltage coupled to said first and second input terminals;
   b. an adjustable DC voltage, said adjustable DC voltage being coupled to said second input terminal of said differential amplifier;
   c. oscillator means for generating an audio voltage;
   d. gating means coupled to said oscillator means for starting and stopping said oscillator means;
   e. pulse stretching means coupled from said output terminal of said differential amplifier to said gating means for stretching the output voltage of said amplifier;
   f. utilization means coupled to the output of said oscillator means for converting said audio voltage to an aural tone; and,
   g. indicating means, coupled to said adjustable DC voltage for indicating the value of said voltage when said aural tone stops.

4. A method for measuring the peak value of an electromagnetic interference wave comprising:
   a. receiving said electromagnetic interference wave;
   b. detecting said wave;
   c. comparing the detected wave with the value of an adjustable DC voltage in a comparator which provides an output voltage when said demodulated wave is greater in value than said adjustable DC voltage;
   d. stretching said comparator output voltage
   e. gating an audio oscillator means, which provides an audible tone by means of an amplifier and transducer, responsive to said output voltage; and,
   f. reading the value of the adjustable DC voltage on an indicating device at the point said audible tone ceases.

5. In an electromagnetic interference voltage measuring system which includes a slideback peak voltage circuit with adjustable DC voltage the improvement which comprises; oscillator means for providing an audible tone, pulse stretcher means responsive to the output of the slideback peak voltage circuit, and gating means responsive to the output of the pulse stretcher means, said gating means being coupled to said oscillator means for starting said oscillator means when said interference voltage exceeds said adjustable DC voltage and stopping said oscillator when said adjustable DC voltage exceeds said interference voltage.

* * * * *